United States Patent [19]

Martinez Apeztegui et al.

[11] 4,313,687
[45] Feb. 2, 1982

[54] PREFABRICATED SPATIAL STRUCTURE

[76] Inventors: Juan Martinez Apeztegui, Jose Ma Salaverria 13-8°; Ignacio Odriazola Espinosa de los Monteros, Sagrada Familia 4,9°, both of San Sebastian, Spain

[21] Appl. No.: 940,513

[22] Filed: Sep. 5, 1978

[51] Int. Cl.³ .............................................. F16B 7/00
[52] U.S. Cl. ...................................... 403/171; 403/320
[58] Field of Search ............... 403/171, 172, 176, 170, 403/173, 174, 177, 178, 320; 46/29

[56] References Cited

U.S. PATENT DOCUMENTS

| | | | |
|---|---|---|---|
| 573,397 | 12/1896 | De Graffenried et al. | 403/320 X |
| 3,980,408 | 9/1976 | Jachmann | 403/171 X |
| 3,995,962 | 12/1976 | Mylaeus | 403/171 X |

FOREIGN PATENT DOCUMENTS

| | | | |
|---|---|---|---|
| 539143 | 11/1931 | Fed. Rep. of Germany | 403/171 |
| 901955 | 6/1954 | Fed. Rep. of Germany | 403/171 |
| 2615796 | 10/1977 | Fed. Rep. of Germany | 403/171 |
| 2736635 | 10/1978 | Fed. Rep. of Germany | 403/171 |
| 2233882 | 1/1975 | France | 403/171 |
| 410185 | 3/1945 | Italy | 403/171 |
| 475005 | 10/1952 | Italy | 403/173 |

*Primary Examiner*—James Kee Chi
*Attorney, Agent, or Firm*—Wenderoth, Lind & Ponack

[57] ABSTRACT

A prefabricated spatial structure includes rods which are rectilinear tubes having a circular section and closed at each end by a cap which is joined to the tube by means of an annular weld or any other convention system and which has a hole concentric with the axis of the rod. The circular head of a special bolt is housed in the interior part of the cap. The bolt includes two threaded bodies having different diameters and opposite threading directions, the threaded body closest to the head having a smaller diameter than the diameter of the hole of the cap. The other threaded body is situated at the end of the bolt and has threads identical to that of the holes made in a node. The difference in diameters of the bodies is determined by a step which forms a flat or truncated resting surface coaxial with the axis of the bolt. The bolt is provided with a threaded nut which is coupled to the threaded body having the greater diameter. Each node has a series of threaded holes, the axes of which meet at the geometric center of the node.

10 Claims, 9 Drawing Figures

PREFABRICATED SPATIAL STRUCTURE

BACKGROUND AND SUMMARY OF THE INVENTION

The field of application of the invention is that of spatial structures formed by the repetition and conjunction of many simple and geometrically similar elements. It is particularly applied to those spatial structures formed by rods and nodes, the arrangement of which is such that the rods are predominantly subjected to traction or compression strains.

The object of this invention is to provide a joining system formed of nodes and rods which are economical to manufacture and simple to use, and which provide the desirable properties of:

(A) The specific dimensions between the axes or centers of the nodes of the structure are determined at the time of manufacture, according to the particular project, without requiring adjustments or correction on site.

(B) Any rod can be assembled or dismantled, even after the relative positions between adjacent nodes have been fixed.

(C) The aforementioned property is fulfilled irrespective of the geometry of the structure. This property together with the former permit the assembly to be effected in any assembling order.

(D) The system has versatility such that the rods can meet at the node in any direction of space, without any restriction other than the existence of a minimum angle between adjoining rods which prevents interference therebetween.

(E) The system is resistant in all directions, a desirable property when the system is applied to various shapes differing from conventional mesh shapes.

(F) All the resistant sections can be utilized for the optimum yield of the material.

(G) The assembly of the node with the joining elements reproduces a behavior sufficiently close to that of a calculated hypothetical behavior of space lattices, that is to say to a pure joining with elevated axial rigidity and with reduced rigidity to bending found in the maximum proximity to the geometric center of the node.

In the system to be described hereinafter, the nodes can have any geometric shape, provided that the shape adapts to the reception from different directions in which the rods can lead, although the original spherical shape provides a maximum degree of regularity in space and adapts more appropriately to any geometric structural shape, maintaining an equalness in the resistant capacity in all of them. To obtain a greater rigidity, the node is preferably a sphere, solid or hollow. To provide the node with accessibility from the exterior, the mechanical connections to the ends of the rods are left-hand threaded holes whose axes preferably meet at a point which shall be referred to as the geometric center of the node. The sphere presents, at the outer portion surrounding each hole, a plane perpendicular to the axis of the hole which shall be referred to as "seating surface", inasmuch as a corresponding part or surface of the rod rests thereon.

The rod is formed by a tubular profile having a circular section, which is closed at the ends by means of caps or plugs having a slightly cylindrical or truncated shape. These caps have a cylindrical hole coaxially aligned with the axis of the rod and are joined to the tube by means of a butt-welded annular cord which encircles the entire thickness of the tube in order to transmit the strains which the resistant section thereof is capable of withstanding. Through the hole of the cap is introduced a special bolt provided with a cylindrical head and a stem having two threaded portions having different diameters and reverse or opposite threading directions. The diameter of the head is greater than that of the hole of the cap so that the head can rest on the inner surface of the cap. The threaded portion nearest to the head has a right-hand thread having an outer diameter smaller than that of the hole of the cap so that it can pass therethrough and turn freely in its interior. The other portion of the bolt, situated at the end opposite to the head, has a left-hand thread of the same size and type as the threaded holes of the node. The length of the other or outer threaded portion, which shall be referred to as "penetration length" since it is the dimension by which the bolt penetrates into the node, should be at least that necessary so that, depending on the type of bolt and on the quality of the material, the forces to which the rod is subjected can be transmitted to the nods. The two threaded portions of the bolt are coaxial and the difference between the diameters thereof is such that the diameter of the inner threaded portion is greater than the diameter of the outer threaded portion, the two portions being separated by a plane perpendicular to the axis of the bolt, which plane presents an annular surface which shall be referred to as "resting surface" and which, upon complete assembly of the rod, will rest precisely on the "seating surface" of the corresponding hole of the node. The assembly is completed with a right-hand threaded nut which is coupled to the threaded portion having a greater diameter of the bolt. The elements of the assembly are positioned such that the head of the bolt remains in the interior of the rod, with the stem passing through the cap toward the exterior and the nut threaded on the inner threaded portion which extends through the cap. In the final positioning for assembly, or at initiation of the assembly operation, the nut is at the most exterior or outer part of its threaded portion, so that between the nut and the exterior surface of the cap there is a length of thread, which length shall be referred to as "introduced length". This length of free thread constitutes the magnitude which the bolt will be withdrawn outwardly of the rod with respect to the final position of the assembly. The length of the right-hand or inner threaded portion of the bolt, prefectly defined at the time of manufacture, should be greater than the sum of the thicknesses of the nut and the cap, and in any case the introduced length shall be related to the penetration length, a condition which has the purpose of fulfilling property B above.

Joining of the end of the rod to a node takes place as follows. Firstly, the end of the bolt is placed in front of or facing the corresponding hole of the node. Once the bolt is so positioned, the nut is acted upon by turning it while the outer end of the bolt is slightly pressed against the node to initiate threading therebetween, which later on progresses without the need of exerting the initial pressure. Due to the fact that the bolt has two reversely threading portions, a main feature of this invention is that the same turning direction, during driving of the bolt, can produce two different threading effects, that of the outer threaded portion of the bolt into the hole of the node and that of the nut onto the inner threaded portion of the bolt. The sequence of these two threading steps is independent of the will of the user carrying out the assembly. Before the two reach their respective end limits, both steps offer very limited resistance to threading rotation. However, the first threading effect to be produced is that which has the smaller resistance to its own threaded rotating advance. As a possible development of the complete process, in case the threading of the nut onto the bolt is that which shows the greater resistance, then when acting on the nut, the nut will make the bolt turn, which will penetrate into the node until the resting surface of the bolt abuts against the seating surface of the node. At that moment the resistance to turning of the bolt increases considerably and the nut, still rotated in the same direction, will be threaded onto the bolt in a direction approaching the head until the nut presses the cap at the end of the rod. Thereafter, further turning of the nut encounters resistance corresponding to the simultaneous tightening of the nut against the cap and of the bolt into the node. On the other hand, if the rotation of the bolt is that which offers a greater resistance during the initial turning, then the process will take place in the opposite order, producing first the threading of the nut on the bolt until the nut and the head contact the cap. Then, further turning of the nut causes rotation of the bolt within the cap and threading of the bolt into the node until the bolt abuts therewith.

After assembly and final tightening of the two ends of a rod to their respective adjacent nodes, the relative position between the centers of the nodes is perfectly determined since the distance between the centers of the nodes is the sum of the distances from the centers of the nodes to the corresponding seating surfaces; the distances from seating surfaces of the bolts to the respective seating planes of their heads; and the spacings between the inner resting surfaces of the caps at both ends of the rod. All these dimensions are determined during the manufacture of the elements, based on a given installation or project, none of them requiring any adjustment or correction on site.

Dismantling of a rod is carried out by acting on the nuts in a direction reverse to that described above regarding tightening. The same driving direction of the nut, due to the two threads being of reverse direction, originates the two steps of the process, the first of which consists in that the nut, after initially rotating with respect to the bolt, frees the cap and is moved along the bolt until it establishes contact with the node at which moment it offers a resistance to the turning of the nut with respect to the bolt. Overcoming such resistance, which will be equal to that of tightening, the bolt is unlocked from the node and it starts to turn together with the nut until it leaves the node completely. Once this operation has been made at both ends, the rod can be withdrawn feely without modifying the position of the adjacent nodes, since the introduction of each bolt can be made in a length equal to or greater than that of penetration.

Certain aspects of design and execution should be born in mind to avoid a disadvantage which could otherwise be produced during the previously described assembly process. If, through a greater resistance of the threading of the bolt into the node, the nut advances on the bolt, it can occur that from the moment at which the nut contacts the cap and the cap contacts the head of the bolt, the pressure exerted between the nut and the head presses the cap, thereby creating friction sufficient to prevent the torsional rotation of the bolt-nut assembly, i.e. rotation of the bolt within the cap. In this position the bolt cannot be screwed into the node unless the complete rod turns on its axis, which is not possible if the opposite end has been previously assembled. This phenomenon has the probability of being producing when the friction, originated by the pressure between the nut and the head of the bolt against the respective outer and inner surfaces of the cap, equals the tightening torque which gives rise to the force generated by such pressure. Such situation therefore depends on the helix angle of the threads and on the roughness of the contacting surfaces.

In normal bolts and nuts having a single thread and materials having ordinary surface finishes, the previously mentioned difficulty can be produced and a way of preventing it would be on the basis of a greater helix angle (the thread having a varied inlet of special design) or highly polished and greased contacting surfaces. However, there are other alternative solutions which can be applied if the former is economically disadvantageous and which, by means of providing resistance to the advance of the nut on the bolt, guarantee that the step of advance of the bolt and tightening of the node is produced before the tightening of the nut to the head of the bolt by means of the cap. Without considering them as sole solutions, the following can be considered exemplary:

(A) A circumferential recess may be provided in the inner threaded portion on which is housed an incomplete or diametrically cut washer, so that after preventing the nut from approaching the head of the bolt during the first threading step until tightening of the bolt to the node, the washer can be withdrawn at will to allow tightening of the nut toward the head of the bolt.

(B) A diametral hole may be provided in the inner threaded portion, and a recess may be provided in the nut. The nut insures rotation of the bolt by means of a pin which is introduced through the nut into the hole, thus preventing relative rotation between the bolt and the nut. After tightening the bolt into the node, the pin is withdrawn to be able to effect tightening of the nut.

(C) Two nuts instead of one may be placed on the inner threaded portion so that rotation of the outer nut causes the outer nut to abut the inner or counter-nut, thus causing the bolt to turn until it is tightened into the node. The inner nut is then turned in the same direction until it is tightened to the head of the bolt, and then the outer nut is finally tightened onto the inner nut.

(D) The inner threaded portion may be provided with two or more parallel bevels or cut-outs so that a wrench may be applied thereto to directly rotate the bolt until it is tightened into the node. Then the nut is tightened toward the head of the bolt.

The system of this invention has all the previously mentioned properties. The relative position between the centers of the nodes are perfectly determined by the manufacturing dimensions of the nodes and rods. The introduced distance will be related to the penetration distance so that it is possible to assemble and dismantle any rod even after the positions of the adjacent nodes have been fixed. The accesses to the nodes through the exterior of the same permit the former property to be carried out for any geometrical structural design.

Departing from a spheric shape for the node, obtained by casting, forging or mechanical working, the adaptation of a rod in one direction is only a question of the formation of the corresponding threaded hole. This can be done in any direction of space, obtaining furthermore the same resistant characteristics in all of the rods.

Provided that the welding of the tubular profile to the cap is made under correct conditions, the resistant capacity thereof can be completely utilized, since the complete section thereof is maintained throughout the length of the rod.

The most flexible pieces of which the joining system is comprised only function under axial forces, which makes it possible to obtain a remarkable axial rigidity and a low number of fitting in operations, such that the actual behavior or performance does not depart from the hypothetical calculated behavior of a space lattice.

Naturally, the invention is not limited to the specific details of this specification, but also encompasses those arrangements which could be susceptible to change, with the principle of two threads having reverse directions permitting two tightening operations to be made in the same rotational direction. Among other various embodiments which are to be included within the scope of the invention are, for example:

(A) The nodes need not be spheric but may be polyhedric, hollow or solid, formed by one or plural pieces and made by casting, by shaping and by welding or by complete mechanical working processes.

(B) The rods may be of hollow or filled profiles and have a circular or polygonal section, particularly square or rectangular.

(C) The portion of the bolt having a smaller diameter and which penetrates into the node may have right-hand threads, the other portion of the bolt together with the nut may have left-hand threads.

(D) The seating and resting surfaces may, instead of being flat, adopt other shapes, particularly truncated which offers certain mechanical advantages.

(E) The caps may be plates with outer truncated surfaces for rods having a circular profile or truncopyramidic surfaces for rods having a polygonal profile, and with an inner flat, truncated or truncopyramidic surface, depending on the needs due to the reduction in weight or length of the bolt.

(F) The tube may be butt-welded to the plate, which may be more favourable by way of resistance or angle which can offer manufacturing advantages.

BRIEF DESCRIPTION OF THE DRAWINGS

Further objects, features and advantages of the invention will be apparent from the following detailed description, taken with the accompanying drawings, wherein.

DETAILED DESCRIPTION OF THE INVENTION

Figure 1:
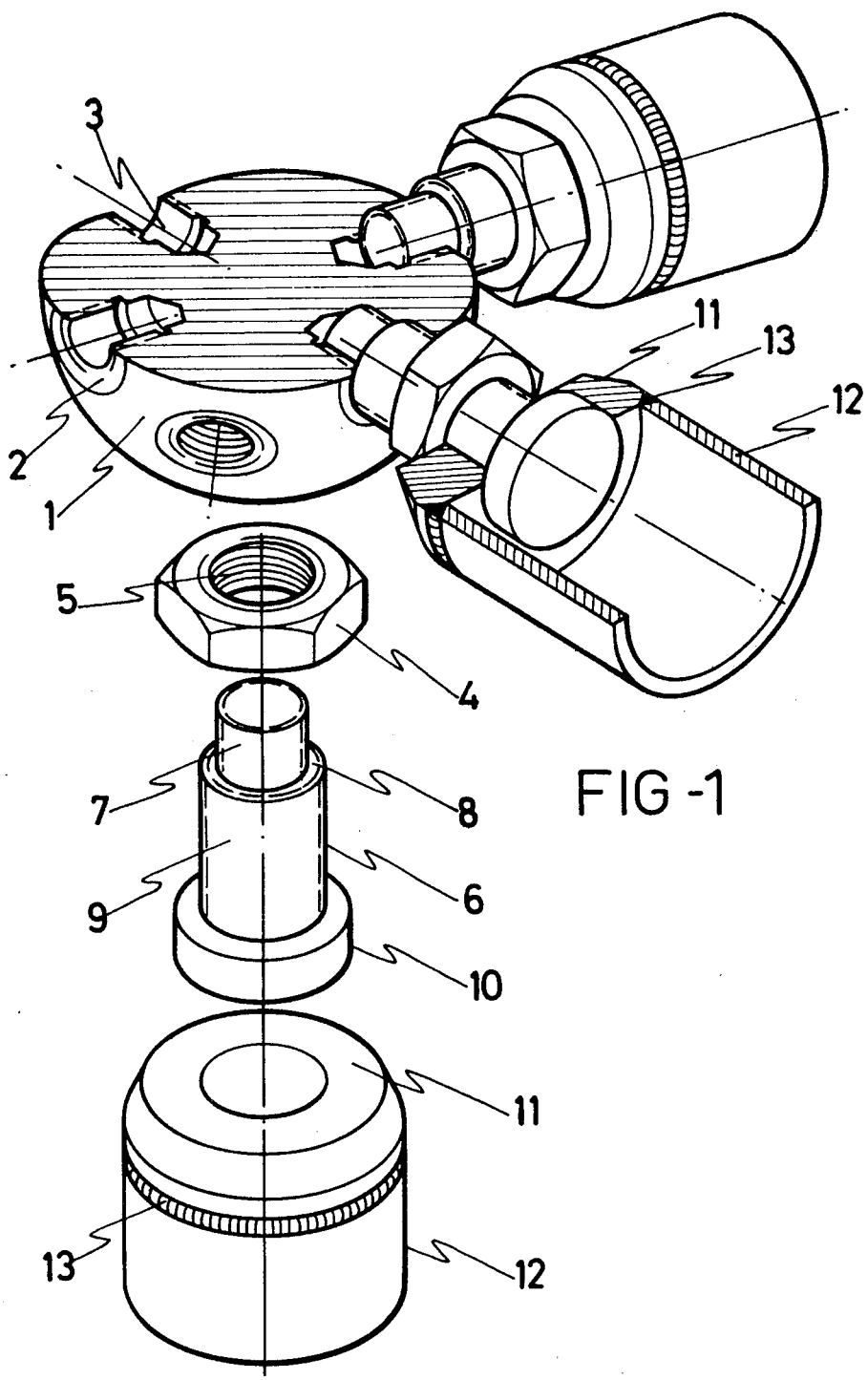
FIG. 1 is an exploded perspective view, partially in section, illustrating a node and various rods employed in the spatial structure of the invention.

FIG. 1 is a perspective exploded view illustrating a spherical node 1 which is shown sectioned along a horizontal plane on which are located the axes of four threaded holes 3 each of which has surrounding the entrance thereof a bevel 2 which constitutes a seating surface for a step 8 of a bolt. The number of threaded holes 3 correspond to the number of rods 12 to be joined to the node, only the lower half of which is illustrated. The ends of two rods are illustrated meeting at the node in the plane of the section in an assembled position, the end of one rod being shown in the same section as through the node. Also shown is another rod to enter the node from below, this rod and the joining structure thereof being illustrated as exploded. The rods 12 have a circular section and are closed at their ends by caps 11 to which they are joined by means of welding 13. A head 10 of the bolt 6 is housed in the interior of the rod behind the cap 11. Bolt 6 has two threaded portions 7 and 9 which have opposite threads and which are separated by the step 8. A nut 4 is threaded by its thread 5 onto the inner threaded portion 9 of the bolt 6.

After assembly of the rod and of the attachment elements, they cannot be separated from interiorly of the rod, since the head 10 of the bolt 6 is always situated in the inner part of the tube whose end is closed by the cap 11.

FIGS. 2, 3, 4 and 5 represent a possible arrangement of the successive steps of the assembly of an end of a rod to a node.

Figure 2:
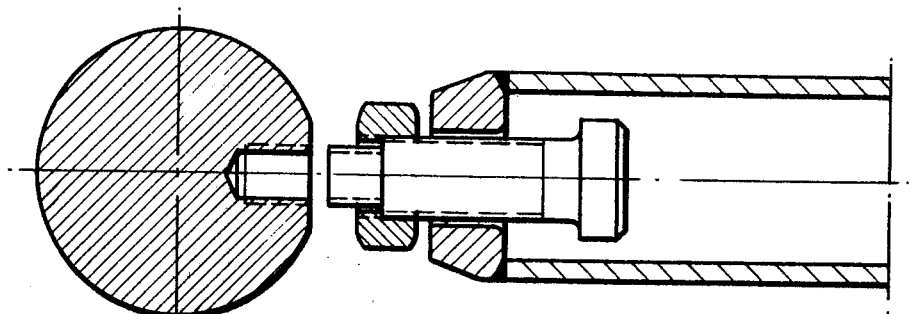
FIGS. 2–5 are sections showing the sequential connection of a rod to a node.

FIG. 2 represents a node and an end of a rod facing the same, in a position for initiating the assembly. The nut 4 is partially threaded onto the portion 9 of the bolt so that the same can be extended into the interior of the rod, allowing the end of the rod to be located at a distance from the node equal to or smaller than the distance which will remain after assembly.

Figure 3:
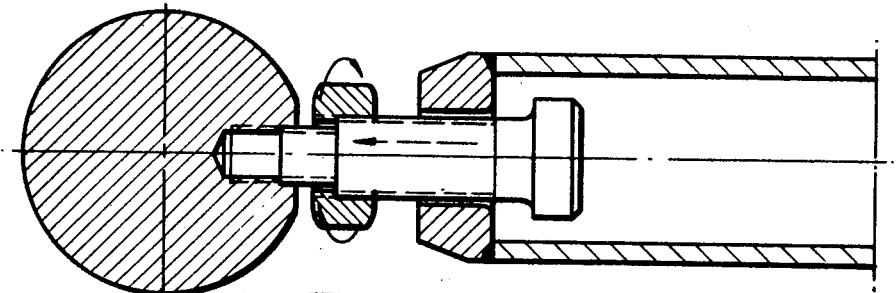

FIG. 3 represents a first moment of the assembly after having started threading of the portion 7 of the bolt into the node. The nut is activated by means of a wrench (activation which is represented in the figures by means of continuous arrows) the drawing corresponding to the phase in which rotation of the nut causes longitudinal movement or advancement of the bolt into the node (which advancement is represented by discontinuous arrows).

Figure 4:
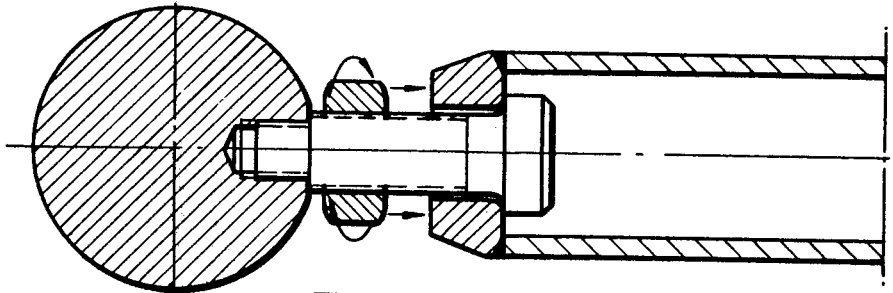

FIG. 4 represents a more advanced step, after the moment at which the bolt has reached its final position with respect to the node. The nut, activated by a wrench, rotates along threaded portion 9 and approaches the head of the bolt.

Figure 5:
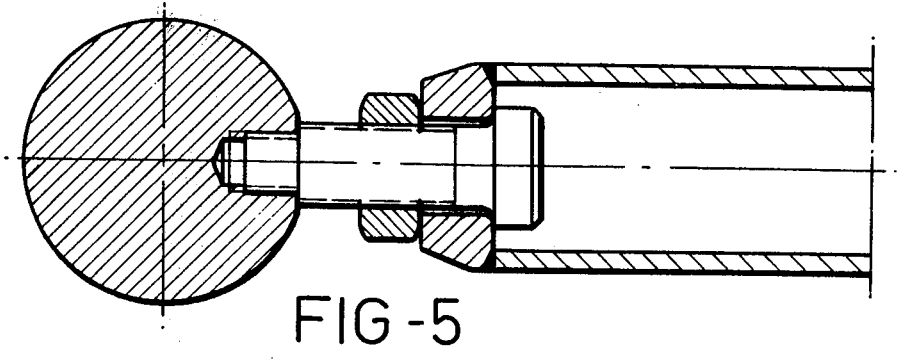

FIG. 5 represents the final position at which the nut has contacted the cap and has caused the cap to be against the head of the bolt. After establishing these contacts, due to the reverse threading directions of portions 7 and 9, continued activation of the nut simultaneously produces tightening of the nut to the head of the bolt and of the bolt to the node, if this second tightening had not been sufficiently produced previously.

FIGS. 6, 7, 8 and 9 are perspective views representing four modifications to the arrangement represented in FIG. 1, with respect to the movable parts of the end of the rod, and specifically to insure rotation of the bolt with the nut to thread the bolt into the node.

Figure 6:
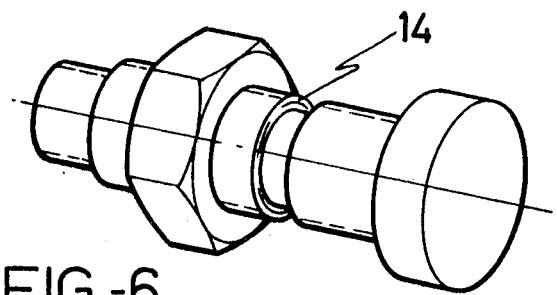
FIGS. 6–9 are perspective views of modifications of the invention.

FIG. 6 shows an incomplete washer 15 which, when inserted into a cylindrical recess 14 in the threaded portion 9 prevents the nut from approaching the head of the bolt. Thus, when the nut is rotated, if the nut tends to rotate on threaded portion 9 of the screw, when the nut establishes contact with the washer, it cannot continue with its advance and it will cause the bolt to rotate, which will insure the threaded portion 7 is threaded into the node until tightened therein, at which moment the washer is withdrawn to continue with the assembly operations of FIGS. 4 and 5.

Figure 7:
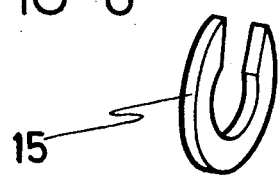
Figure 7:
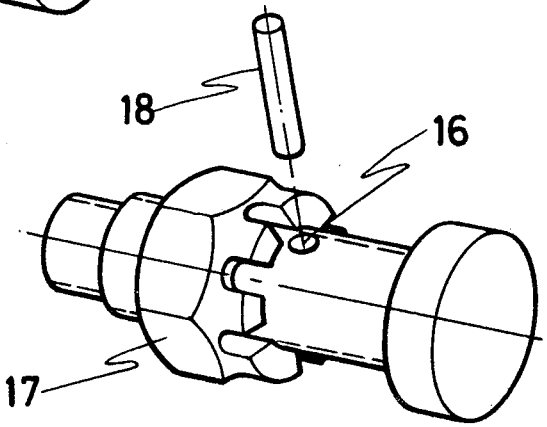

FIG. 7 shows a bolt with a hole 16 in its threaded portion 9 and a nut 17 whose rotation with respect to the screw is prevented by a pin 18 which passes through the nut into the hole 16 in the bolt. After tightening of the bolt to the node, the pin is withdrawn and the assembly operations of FIGS. 4 and 5 are continued. Both hole 16 and recess 14 illustrated in FIG. 6 will preferably be formed in the zone of portion 9 which is finally covered by the nut.

Figure 8:
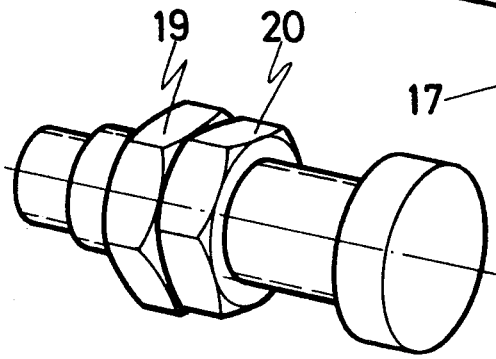

FIG. 8 shows a screw with two nuts which, in place of the nut 4 illustrated in FIG. 1, can each have individually a smaller thickness than nut 4. In the first part of the process, the outer nut 19 is rotated and, on contacting the inner nut 20 in the form of a counter-nut, will cause the bolt to turn until it is tightened into the node. Then, the inner nut 20 is rotated to move the same against the cap, which also has pressed thereagainst the head of the bolt.

Figure 9:
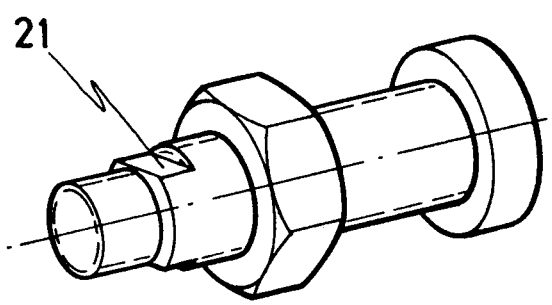

FIG. 9 shows a bolt which there are formed two bevels or cut-out portions 21 which permit the bolt to be rotated directly by a wrench until it is tight in the node, whereafter the nut is rotated until it presses against the cap with the head of the bolt also pressed against the cap.

We claim:

1. In a prefabricated spatial structure of the type including a plurality of nodes, a plurality of rods extending between and structurally joined to selected said nodes to form a predesigned spatial configuration, and connecting means for joining each end of each said rod to a respective said node, the improvement wherein:

for each adjacent pair of said nodes to be connected by a said rod, the spacing between the centers of said pair of nodes, taken along the axis of said rod, comprises a predetermined first distance;

each said rod comprises a tube having a closed periphery and opposite ends, a cap fixedly joined to and closing each said tube end, said cap having therethrough a hole aligned coaxially with said tube;

each said node has therein a threaded hole aligned coaxially with said tube, and a seating surface on the exterior of said node surrounding the entrance to said threaded hole;

each said connecting means comprises a bolt having a head positioned interiorly of said tube and adapted to abut the interior surface of said cap, and a stem extending from said head, through said hole in said cap and axially exteriorly of said tube toward said threaded hole in said node, said stem including an inner first threaded portion adjacent said head and extending through said hole in said cap and an outer second threaded portion axially separated from said first threaded portion by a step adapted to abut said seating surface, the diameter of said first threaded portion being less than the diameter of said hole in said cap and greater than the diameter of said second threaded portion, the threads of said second threaded portion being complementary to the threads of said threaded hole in said node such that said second threaded portion may be threaded into said threaded hole until said step abuts said seating surface, the threads of said first threaded portion extending oppositely to said threads of said second threaded portion, and nut means threaded onto said first threaded portion for, upon rotation of said nut means and due to the opposite threading directions of said threads of said first and second threaded portions, selectively connected said rod to or disconnecting said rod from said node by creating relative threading rotation between said second threaded portion and said threaded hole in said node, thereby impart relative axial movement of said bolt with respect to said rod and to said node, and by creating relative threading rotation between said nut means and said first threaded portion, to thereby impart relative axial movement of said nut means with respect to said cap;

for said adjacent pair of nodes, the spacing between seating surfaces comprises a predetermined second distance; and when said rod is disconnected from said pair of nodes, the total length of said rod and the portions of said bolts extending axially beyond the ends of said rod is less than said predetermined second distance, such that said rod may be connected to or disconnected from said nodes without alteration of said predetermined first distance.

2. The improvement claimed in claim 1, wherein when said rod is disconnected from said pair of nodes and coaxially aligned with said threaded holes in said pair of nodes, the sum of the distances between said heads in opposite ends of said tube and the respective said inner surfaces of said caps closing said opposite ends of said tube equals the sum of the distances between said steps of said bolts and the respective said seating surfaces of said nodes, such that said rod may be tightly connected to said nodes without alteration of said predetermined first distance and without imparting substantial tension to said rod.

3. The improvement claimed in claim 1, wherein said cap is welded to said tube end.

4. The improvement claimed in claim 1, wherein said tube and caps have circular transverse cross-sectional configurations.

5. The improvement claimed in claim 1, further comprising means for, when said rod is disconnected from at least one of said nodes but coaxially aligned with said threaded hole in said node, ensuring that rotation of said nut means in a fastening direction will first cause relative rotation between said second threaded portion and said threaded hole in said node until said step abuts said seating surface, and will then allow relative rotation between said nut means and said first threaded portion until said nut means abuts the outer surface of said cap.

6. The improvement claimed in claim 5, wherein said ensuring means comprises means forming greater friction between the threads of said nut means and said first threaded portion than between the threads of said second threaded portion and said threaded hole.

7. The improvement claimed in claim 5, wherein said ensuring means comprises a recess formed in said first threaded portion, and removable washer means selectively insertable into and removable from said recess for abutting against said nut means and for preventing rotation thereof with respect to said first threaded portion.

8. The improvement claimed in claim 5, wherein said ensuring means comprises a hole formed in said first threaded portion, and removable pin means selectively insertable into and removable from said hole for engagement with said nut means and for preventing rotation thereof with respect to said first threaded portion.

9. The improvement claimed in claim 5, wherein said ensuring means comprises counter nut means, threaded onto said first threaded portion at a position between said nut means and said cap, for abutting against said nut means and for preventing rotation thereof with respect to said first threaded portion.

10. The improvement claimed in claim 1, further comprising cut-out means formed in said first threaded portion for, when said rod is disconnected from at least one of said nodes but coaxially aligned with said threaded hole in said node, enabling said bolt to be rotated independently of rotation of said nut means such that said second threaded portion may be threaded into said threaded hole in said node prior to and independently of relative rotation of said nut means with respect to said first threaded portion.

* * * * *